United States Patent [19]

Myers et al.

[11] 4,442,064
[45] Apr. 10, 1984

[54] THERMOFORMING AND SELF-ALIGNMENT TRIMMING METHOD AND APPARATUS

[75] Inventors: Donald W. Myers; Samantha L. Vivlamore, both of Canandaigua, N.Y.

[73] Assignee: Mobil Oil Corporation, New York, N.Y.

[21] Appl. No.: 316,174

[22] Filed: Oct. 29, 1981

Related U.S. Application Data

[63] Continuation of Ser. No. 206,201, Nov. 12, 1980, abandoned, which is a continuation-in-part of Ser. No. 942,836, Sep. 15, 1978, Pat. No. 4,239,727.

[51] Int. Cl.³ .............. B29D 27/00; B29C 17/03; B29C 17/10; B29H 3/06
[52] U.S. Cl. .................. 264/551; 264/554; 264/153; 264/321; 425/301; 425/302.1; 425/307; 425/817 R
[58] Field of Search ............ 264/321, 547, 548, 549, 264/550, 153, 554, 551; 425/301, 302.1, 292, 291, 817 R, 309, 294, 306, 307, 289

[56] References Cited

U.S. PATENT DOCUMENTS

| | | | |
|---|---|---|---|
| 1,062,028 | 5/1913 | Pierce | 425/307 X |
| 3,115,677 | 12/1963 | Thiel | 264/549 |
| 3,240,851 | 3/1966 | Scalora | 425/302.1 X |
| 3,475,526 | 10/1966 | Seto | 425/306 X |
| 3,518,334 | 6/1970 | Carrigan et al. | 264/321 X |
| 3,564,655 | 2/1971 | Smith | 425/307 X |
| 3,771,938 | 11/1973 | Pinto et al. | 425/294 X |
| 3,785,762 | 1/1974 | Butzko | 425/289 |
| 3,825,166 | 7/1974 | Padovani . | |
| 3,917,770 | 11/1975 | Jackson | 264/321 X |
| 4,123,956 | 11/1978 | Harvey . | |
| 4,239,727 | 12/1980 | Myers et al. | 264/321 X |
| 4,302,415 | 11/1981 | Lake | 264/554 X |

*Primary Examiner*—Philip E. Anderson
*Attorney, Agent, or Firm*—A. J. McKillop; M. G. Gilman; J. F. Powers, Jr.

[57] ABSTRACT

A method and apparatus are described for cutting the web remaining from a plastic sheet containing thermoformed articles into strips, loosely indexing and aligning a plurality of thermoformed articles in each strip with article punches, sequentially isolating the articles from each other so that they have complete freedom of movement in both across-machine and machine directions, exactly registering the articles with the article punches in a selected sequence, precisely trimming the articles from the plastic web, and ejecting them from the apparatus.

24 Claims, 4 Drawing Figures

THERMOFORMING AND SELF-ALIGNMENT TRIMMING METHOD AND APPARATUS

CROSS-REFERENCE TO RELATED APPLICATION

This application is a continuation of co-pending application Ser. No. 206,201, filed on Nov. 12, 1980, now abandoned which, in turn, is a continuation-in-part of Ser. No. 942,836, filed Sept. 15, 1978, for "Method and Apparatus for Thermoforming Thermoplastic Foam Articles", now U.S. Pat. No. 4,239,727, issued Dec. 16, 1980.

BACKGROUND OF THE INVENTION

1. Field of the Invention

This invention relates to trimming of thermoformed articles from a plastic web. It particularly relates to precise trimming of such articles by obviating the effects of unequal spacings between the articles. It specifically relates to a method and apparatus for loosely indexing and aligning a plurality of thermoformed articles with article punches, isolating the articles from each other so that they exactly register themselves with the punches in a selected sequence, precisely trimming them from the plastic web, and ejecting them from the apparatus.

2. Brief Description of Prior Art Practices

Thermoformed plastic articles are currently trimmed from the surrounding web of sheet material by treating the web as a complete unit. There is consequently no freedom of movement of any article in relation to those surrounding it. As a result, accuracy and consistency of trim depend wholly on the indexing of the unit or web into the trim area and on the shrinkage values of the web that are built into the trim tool. However, shrinkage values for thermoformed plastic articles and for the surrounding web can vary with sheet characteristics, article size and shape, and conditions of thermoforming. In consequence, indexing of the articles and surrounding web into the trim area often becomes quite critical, so that trimmed edges of articles may be unsatisfactory and cause significant product rejects.

There is consequently a need for a method and apparatus that can obviate the present practice of estimating shrinkage values for indexing of the web into the trim area and for construction of the trim tool.

A potentially useful concept is disclosed in U.S. Pat. No. 1,062,028 for sheets of cooked pastry cones. When such sheets are removed from the cooking machine, more or less uneven shrinking of the pastry connecting the cones is found to have occurred, so that the cones are more or less unevenly interspaced. The disclosed trimmer comprises tapered plungers, disposed in rows of progressively decreasing length and having outwardly tapered spindles which successively center the cones in opposed tubes. The longer plungers trim the bottom row of cones without bringing any strain upon the remaining cones. Because the centers of the tubes are more widely interspaced than the centers of the baked cones, each succeeding row of cones is slightly raised when it is engaged by the plungers and forced into the tubes after the lower row has been sheared off.

This trimming operation is a discontinuous one, however, and seems to require a stiff and non-resilient sheet as pressure is transversely exerted by the tapered plungers. There is freedom of movement of the cones in the direction of decreasing length for the plungers. There is no freedom of movement side-to-side (across the web). This relieved-punch concept also requires that all cones along a row are in parallel.

U.S. Pat. No. 3,785,762 describes a thermoforming apparatus which includes a die-cutting press comprising a top and bottom platen which are driven by a toggle mechanism arranged so that the upper die comes down around the thermoformed article, providing a self-centering action, and then the lower platen rises to complete the cutting action. This self-centering action compensates for minor variations in the parts as they are molded and indexed, but it appears to be operable for a single thermoformed article per stroke and cannot compensate for minor variations in distances between a plurality of thermoformed articles being trimmed.

A hole-punching device comprising rigidly mounted cylindrical holes and adjustable ball punches, having a larger diameter than the diameter of cylindrical female die elements, is described in U.S. Pat. No. 4,123,956 for cutting a plurality of holes in a thin elastomeric material. However, the problems surmounted by this device are caused by the thinness and elasticity of the elastomeric sheet, and there are no preformed articles to be trimmed from the sheet.

SUMMARY OF THE INVENTION

It is accordingly an object of this invention to provide a device for trimming a plurality of thermoformed articles, which are connected to each other by a surrounding web that remains from the original plastic sheet, after a single indexing operation.

It is also an object to provide a two-stage registering means for a series of sequentially performed trimming operations.

It is further an object to provide a method for exactly trimming a plurality of articles that are disposed in crossmachine and machine direction rows after thermoforming the articles from a plastic sheet.

It is additionally an object to provide a method for loosely registering with and fitting a plurality of thermoformed plastic articles over a plurality of supporting punches and thereafter shearing this web and separating each article from all surrounding articles, then exactly registering each loosely fitted article with its punch, and finally precisely trimming each article from its surrounding web with the supporting punch.

In accordance with these objects and the principles of this invention, a self-alignment trimming apparatus is hereinafter described which comprises an indexing assembly and a trim tool which comprises a punch assembly, a die assembly, and an ejection assembly. The indexing assembly comprises a pivoting linkage controlled by an air cylinder, a shoe arm which is attached at one end to the linkage, and a shoe, having a forward edge conforming in shape to the shape of the article being indexed, which is attached to the other end of the arm. The thermoformed sheet being indexed preferably hangs vertically after passing through the thermoforming apparatus but can travel while disposed horizontally or at any intermediate angle.

The punch assembly comprises a plurality of article punches, which vary in length, and at least one shear punch. The die assembly comprises a die platen having matching openings for the article and shear punches. The ejection assembly includes push rods of sequentially varying length corresponding to the sequentially varying length of the article punches. Therefore, a simultaneous push of the ejection assembly provides for simultaneously occurring contact with the trimmed articles, i.e., the articles are ejected through the article dies all at the same time.

The method of this invention for trimming thermoformed articles from the connecting web remaining from the original plastic sheet comprises:

(a) approximately registering the articles with article punches for performing the trimming;

(b) isolating the articles from all surrounding articles that are capable of restricting movement of the loosely registered articles; and (c) exactly registering and precisely trimming the articles from the surrounding web by moving the punches into shearing relationship with the dies.

This trimming operation is preferably performed sequentially on a plurality of articles after a single indexing operation. The web-shearing step is preferably performed initially in the machine direction before the indexing operation is performed so that indexing is done separately on each of a plurality of strips containing one row of thermoformed articles. The indexing operation results in loosely registering one article, in a selected plurality of articles within a terminal portion of each strip, with its punch. Thereafter, the loosely registered article is separated from all following articles in the remainder of the strip by a shearing operation, whereby it has complete freedom of movement, independently of all surrounding articles, as its punch moves toward the die, while another article in the terminal portion simultaneously becomes loosely registered with its punch and then becomes exactly registered after the first article has been trimmed from its surrounding web, whereby the second article also has complete freedom of movement, independently of all surrounding articles, before trimming is performed. This procedure is continued for all the selected plurality of articles in the terminal portion for each strip.

This self-alignment method of trimming thermoformed articles permits total freedom of movement of each article; the web is slit into strips in the machine direction (imparting across-the-strip freedom) and the web is relieved across the strips by action of a preceding shear punch or article punch (imparting along-the-strip freedom). Such relief from tensional or compressive stresses in the plane of the web can be imparted by any web-cutting means, such as rotating knives, travelling knives, laser beams, shear punches, and article punches. Moreover, it is feasible to operate both the machine-direction and across-machine web-cutting means on the entire sheet after an indexed article or articles have entered the trimming apparatus, without having previously slit the web to form strips.

Although sequential trimming of a selected plurality of articles in a terminal portion of each strip is highly preferred, it is therefore possible to perform a single indexing step for one article in a terminal portion of a strip and then to perform the following steps:

(a) simultaneously to bring all of the articles into loose registration with their punches, (b) simultaneously to shear the web between all the articles and the adjacent articles, (c) simultaneously to bring all of the articles into exact registration with their punches just before precise trimming is performed, (d) simultaneously to move the punches into the dies, whereby precise trimming occurs, and (e) simultaneously to eject all of the trimmed articles.

Moreover, it is feasible to perform this operation as a continuous process, preferably by having the dies on a straight reach of a chain conveyor and by having the punches on a closing reach while gradually bringing punches and articles into approximate alignment and loose registration and then into exact registration after sequential shearing of the connecting web is performed. The closing reach is preferably horizontally disposed, whereby the articles are able to drop by gravity onto the punches after shearing of the web has occurred.

The trim tool can be described more specifically. The punch assembly comprises a moving bolster which is connected to a linear movement means, a punch platen which is attached to the moving bolster, at least one shear punch which is attached to the punch platen, and a plurality of article punches of varying lengths which are attached to the punch platen. The die assembly comprises a stationary bolster, at least one shear die which is attached to the stationary bolster and is adapted to receive the shear punch, and a plurality of article dies which are attached to the stationary bolster and are adapted to receive the article punches and to have the trimmed articles ejected therethrough. The ejection assembly comprises a cylinder, a cylinder rod which is connected to the cylinder and actuated thereby, an ejector bar which is attached to the cylinder rod and is disposed transversely thereto, a plurality of ejector rods of varying lengths which are attached to the ejector bar and disposed transversely thereto in parallel to the cylinder rod, and a plurality of ejector discs which are attached to the ends of the ejector rods and are adapted to reciprocate within the article punches and to bear against a portion of the trimmed articles.

Before the punch assembly is actuated, the indexed article loosely fits within the first article punch and is thereby loosely aligned and registered with it. When the punch assembly is actuated, the shear punch makes initial contact with the web of the strip passing through the trim tool and separates the indexed articles from the remainder of the strip, thereby isolating a terminal portion of the strip which contains the indexed article and the end of the strip, by transversely shearing the strip in the cross-machine direction. The indexed article is thereupon unencumbered in both the cross-machine and machine directions, although it has to bear the very slight weight of the terminal portion. Therefore, the indexed article is able to shift its position slightly and become exactly registered with its punch as the moving bolster continues to move, bringing all of the article punches closer to the web of the terminal portion and sequentially loosely aligning each article with its corresponding article punch and, if additional shear punches are present in the apparatus, bringing each shear punch closer to the web in a sequential manner.

The first article punch becomes exactly registered with the article indexed thereupon and then performs the trimming operation before the next article punch contacts the sheet, so that the second article is independently movable and free to become exactly registered before the web is contacted by its punch. This sequential loose registration, isolation by trimming and/or cross-machine shearing of the preceding article, exact registration, and trimming again occurs because the trimming edges of the article punches are disposed at increasing distances from the web and because they are moved in unison by the moving bolster, so that contact with the web is made at sufficient time-delay intervals that independent movement and exact registration of each article is feasible.

BRIEF DESCRIPTION OF THE DRAWING

The invention may be more perfectly understood by reference to the following drawings.

DESCRIPTION OF THE PREFERRED EMBODIMENTS

Figure 1:
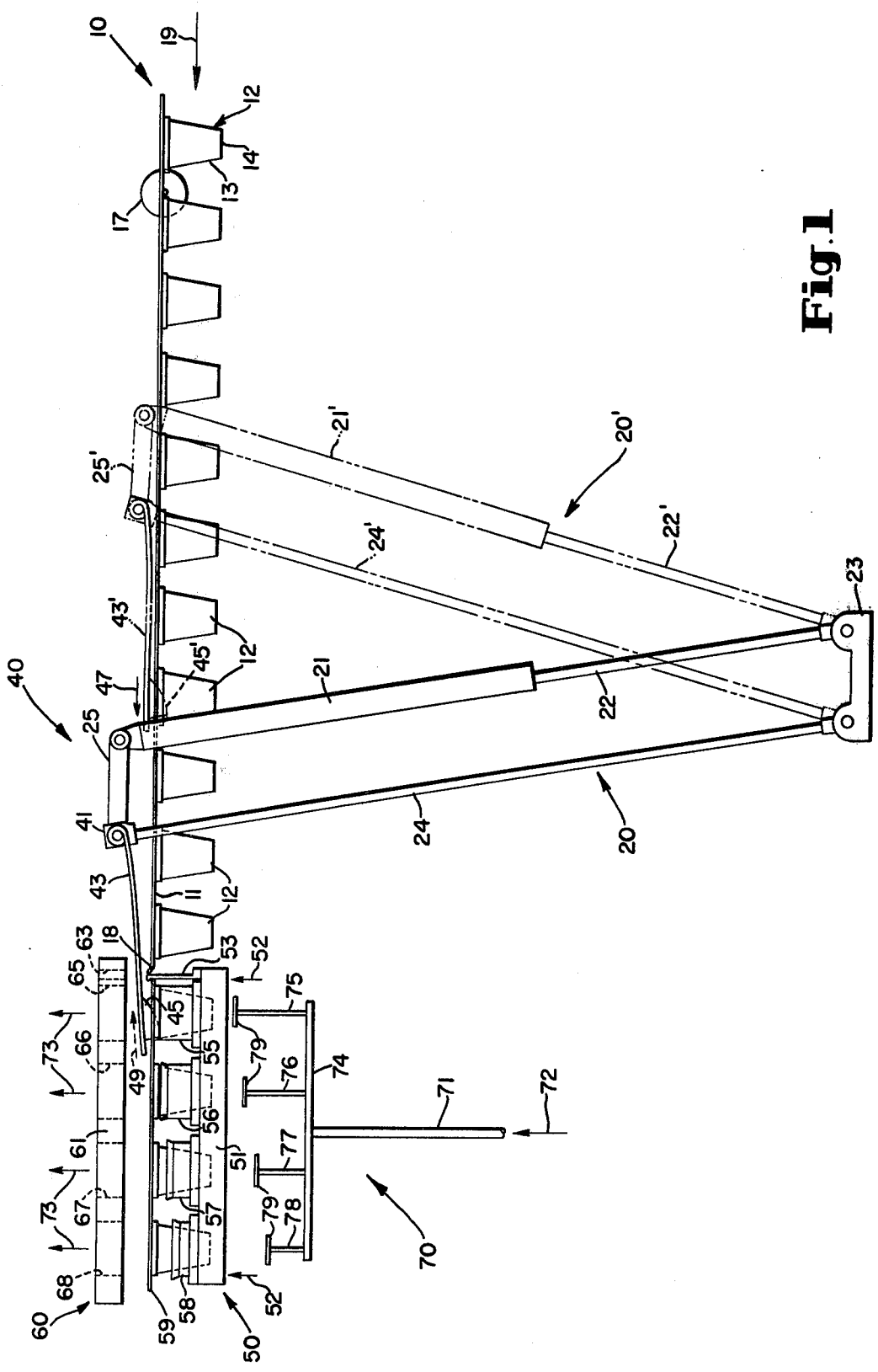
FIG. 1 is a schematic representation in side elevation of a self-alignment trimming operation in which a strip of thermoformed cups is cut from a sheet, indexed by a linkage assembly into a self-alignment trimming apparatus or trim tool, and therein precisely trimmed.

In FIG. 1, a thermoformed sheet 10 contains a plurality of rows of cups 12 which are connected and surrounded by webs 11. Sheet 10 is shown to be moving downwardly in direction 19. Circular knives 17 slit webs 11 in the machine direction to form a plurality of strips, each strip containing a few of cups 12. Vertical guide bars (not shown in FIG. 1) are located along the edges of each strip, both front and back, for separating adjacent strips while a row of brushes (also not shown in FIG. 1) are disposed on each side of the cups for guiding cups 12 as the strip is indexed down into the trim tool. A cup 12 has side 13, base 14, inner lip 15, and outer rim 16.

The indexing assembly comprises indexing linkage 20 and indexing arm assembly 40. As seen in FIG. 1, indexing linkage 20 comprises a cylinder 21, a piston rod 22 which is operably connected to cylinder 21, a base 23 which is rigidly attached to a frame (not shown in the drawings) and to which piston rod 22 is pivotally connected, an arm 24 which is also pivotally connected to base 23, and a short link 25 which pivotally connects both arm 24 and cylinder 21.

Indexing arm assembly 40 comprises attachment block 41 which is attached to arm 24, shoe arm 43 which is rigidly attached to attachment block 41, and shoe 45 which is attached to the outer end of shoe arm 43 so that it is adapted to dip into the open ends of cups 12. Shoe 45 has a forward end which has the same shape as inner lips 15 of cups 12.

Indexing linkage 20 shifts to its uppermost position where it is shown in dotted form. It moves downwardly in direction 47 and reciprocates again toward its uppermost position in direction 49. At its uppermost position, shoe 45 dips into the open end of a cup 12 where its forward end engages rim 15, and then pushes the engaged cup 12 downwardly as linkage 20 is moved by cylinder 21.

When engaged cup 12 has been indexed into the trim tool, indexing arm assembly 40 is lifted and withdrawn upwardly to its uppermost position. Simultaneously, the trim tool is being operated to separate a terminal portion from the remainder of the strip.

The trim tool or trimming apparatus comprises a punch assembly 50, a die assembly 60, and an ejection assembly 70. These three assemblies operate continuously but reciprocally in timed coordination with operation of linkage 20.

Punched assembly 50 comprises a punch platen 51, a shear punch 53 which is rigidly attached to platen 51, a first cup punch 55, a second punch 56, a third punch 57, and a fourth punch 58. All four punches 55–58 are also rigidly attached to punch platen 51 and vary sequentially in length.

In the position shown in FIG. 1, as shoe 45 is being disengaged from cup 12, punch 55, which had been loosely aligned or registered with cup 12, has moved partially toward web 11 in direction 52, and shear punch 53 has cut web 11, forming upturned web 18. After movement of punch 55 through an additional short distance, it will engage web 11, cut through it, and slide beyond web 11 into die assembly 60.

Die assembly 60 comprises a die platen 61, a knife recess 63 in platen 61, and first, second, third, and fourth die recesses 65, 66, 67, 68, respectively, which are aligned with punches 55–58.

Ejection assembly 70 comprises main ejection shaft 71, lateral ejection arm 74 which is rigidly attached to one end of shaft 71, and first, second, third and fourth push rods 75, 76, 77, 78, respectively, which are rigidly attached to arm 74, in parallel with shaft 71, and ejector discs 79 at the ends of each push rod 75–78. Ejection assembly 70 is moved in direction 72 by an air cylinder (not shown in FIG. 1). This motion results in each of the cups 12 that are trimmed by punches 55–58 being ejected simultaneously in direction 73 through die recesses 65–68, perpendicularly to the plane of web 11 remaining from original sheet 10.

Figure 2:
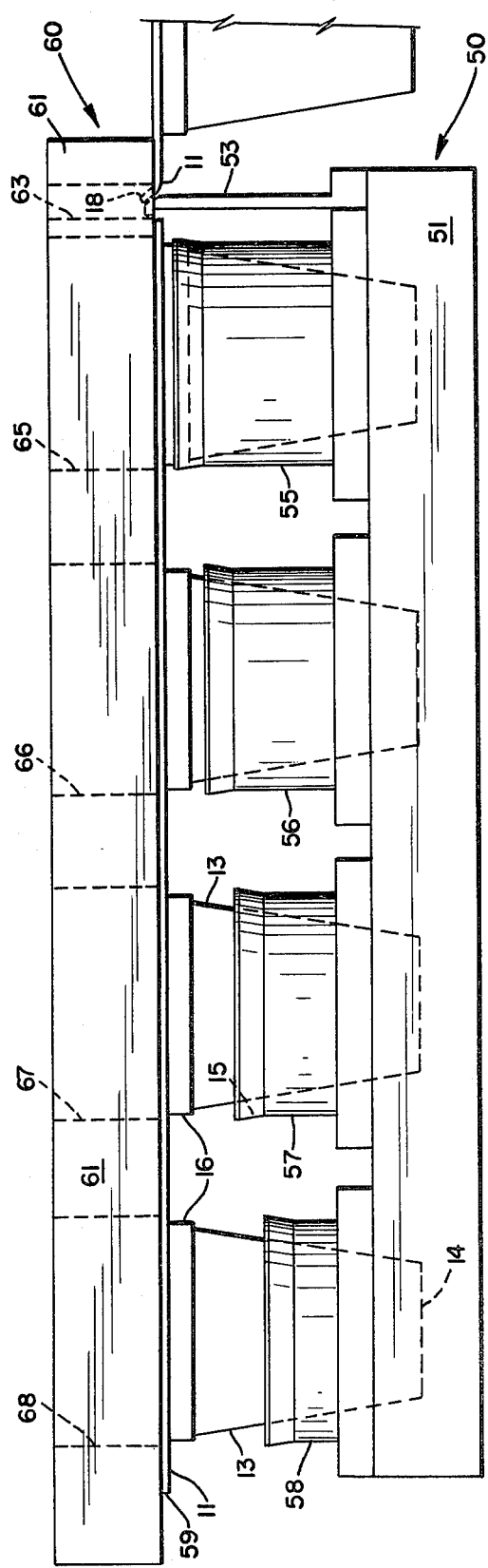
FIG. 2 is an enlarged side elevation of the self-alignment trimming apparatus of FIG. 1, showing the stage at which the shear punch has initially isolated a terminal portion of the strip from the remainder of the strip by cutting the web in the cross-machine direction.
Figure 3:
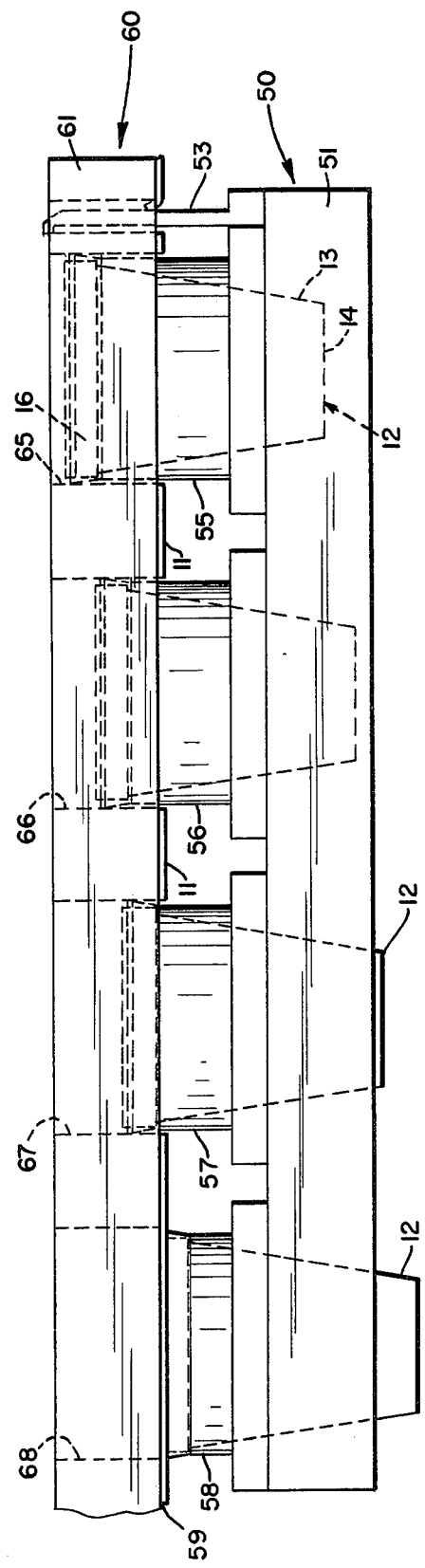
FIG. 3 shows the same side elevation as FIG. 2, just before the terminal stage of the trimming operation when the fourth article punch has contacted the web.

The sequential punching movements of platen assembly 50 and die assembly 60 are shown in more detail in FIGS. 2 and 3. FIG. 2 shows the four-tier trim tool in approximately the same position as seen in FIG. 1, and FIG. 3 shows the trim tool as it has almost reached its final closing position, at the moment that punch 58 has just engaged web 11. When punch 58 will have cut through web 11 and moved to approximately the same depth within platen 61 as punch 57 is shown in FIG. 3 to have attained, platen 51 will have reached its closest position to die 61 and will immediately reciprocate back toward its opening position while ejection assembly 70 will move in direction 72, so that all four ejector discs 79 simultaneously contact bottoms 14 of the four trimmed cups 12 and begin to eject the cups through die recesses 65–68 in direction 73.

Figure 4:
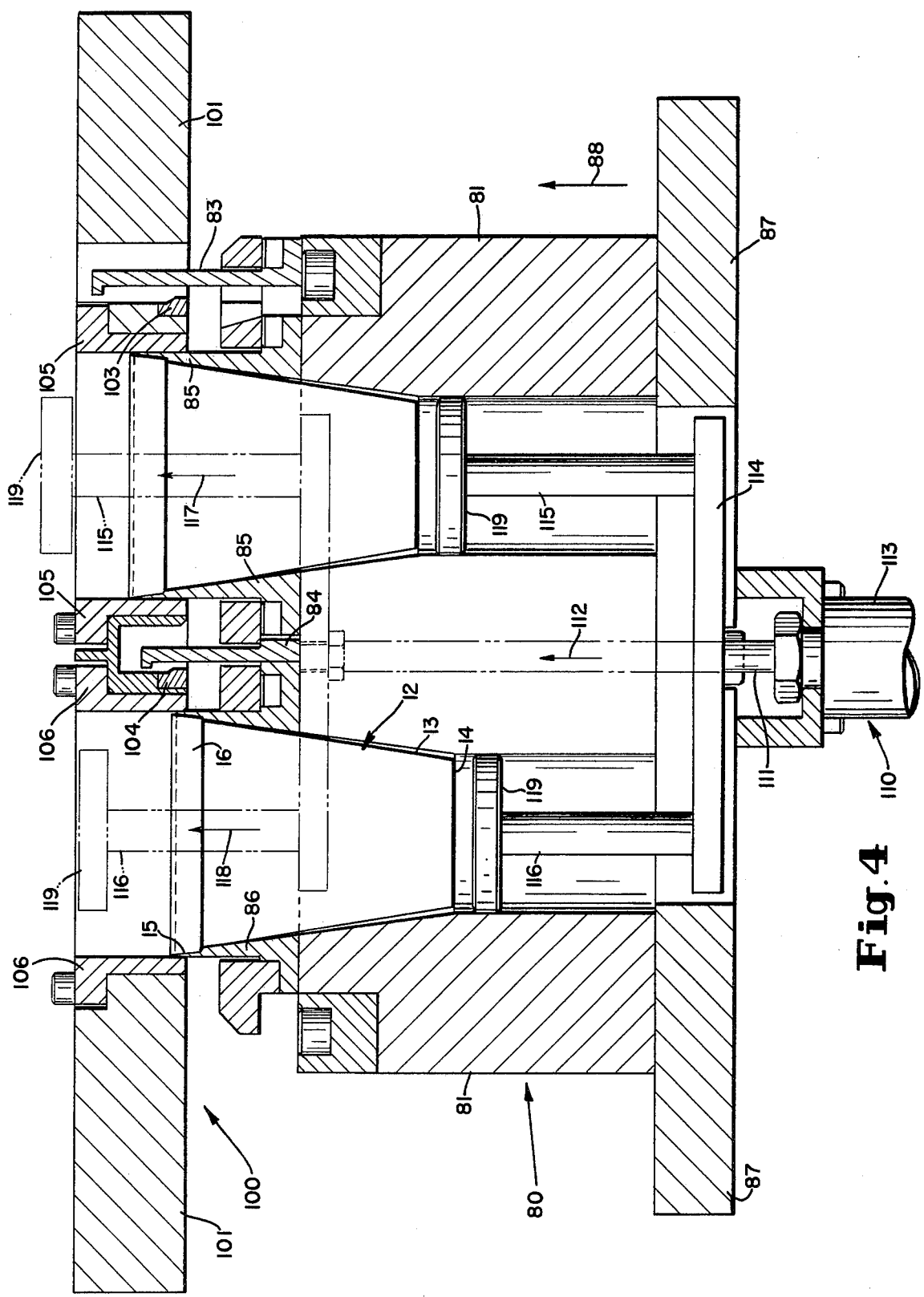
FIG. 4 is a detailed cross-sectional side view of a two-tier self-alignment article punch or trimming apparatus which includes two shear punches for transversely shearing the strip and thereby isolating each cup to be trimmed, and which also shows the ejection mechanism in initial (solid) and final (dotted) positions.

The two-tier trim tool or trimming apparatus shown in detail in FIG. 4 comprises a punch assembly 80, a die assembly 100, and an ejection assembly 110. Punch assembly 80 comprises a punch platen 81, a first shear punch 83, and a second shear punch 84 which are rigidly attached to punch platen 81, a first article punch 85 and a second article punch 86 which are also rigidly attached to platen 81, a moving bolster 87 to which platen 81 is attached, and a DC-drive cam (not shown in FIG. 4) which moves bolster 87 in direction 88.

Shear punches 83, 84 are disposed transversely to the incoming strip, so that they cut it in the cross-machine direction. They have unequal lengths, so that they shear each web sequentially, and they are disposed a sufficient distance apart that they bisect succeeding webs. Article punches 85,86 also have unequal lengths and are spaced apart so that they approximately coincide with the inter-cup spacing to be expected. Shear punch 84 thereby cuts the web after article punch 85 has relieved stresses by its trimming operation but provides insurance that the second cup, loosely aligned and registered with article punch 86, will be completely independent and free to float during the short time that article punch 86 is completing its closing operation, so that exact registration can occur.

Die assembly 100 comprises a stationary bolster (die platen) 101, a first shear die 103, a second shear die 104, a first article die 105, and a second article die 106 which are respectively positioned for interacting with shear punches 83,84 and article punches 85,86. Shear dies 103,104 are within recesses which accommodate respective shear punches 83,84. Article dies 105,106 provide recesses for article punches 85,86 and passageways for ejecting trimmed cups therethrough.

Ejection assembly 110 comprises a cylinder rod 111 which is connected to an air cylinder 113 for extension in direction 112, an ejector bar 114 which is rigidly attached to the outer end of rod 111, a first ejector rod 115 and a second ejector rod 116 which are each rigidly attached at one end to bar 114, and a pair of ejector discs 119 which are attached to the other ends of rods 115,116. The initial position of ejection assembly 110 is shown in solid lines in FIG. 4, but the final position, after complete movement of rod 111 in direction 112, is shown in phantom.

First ejector rod 115 has a longer length then second ejector rod 116. Because ejection movements 117,118 of these rods 115,116, respectively, and of their ejector discs 119 are exactly the same in length and occur simultaneously, the differences in lengths of rods 115,116 cause the trimmed cup from punch 85 to be ejected simultaneously with the cup from punch 86.

U.S. application Ser. No. 942,836, filed Sept. 15, 1978 now U.S. Pat. No. 4,239,727, discloses a method and apparatus for thermoforming articles in a plastic sheet wherein a sheet of thermoforming stock material, is preheated, and the preheated stock material is clamped in a fixed position between matched male and female mold members. The preheated stock material is initially partially deformed toward forming cavities of the final mold members by extending plug members from the male mold members. Then the stock material is maintained in a partially deformed condition, with said plug members extended for an interval of from about 0.1 to about 2.0 seconds, without substantial cooling of said stock material. Thereafter, articles are formed by drawing the partially formed preheated sheet into the forming cavities by vacuum, and closing the matched male mold members to chill the stock material and set a final shape therein. Such sheet with final shaped articles formed therein can be trimmed in accordance with the alignment method and apparatus of the present application. U.S. Ser. No. 942,836 is incorporated herein by reference.

Because it will be readily apparent to those skilled in the art that innumerable variations, modifications, applications, and extensions of these embodiments and principles can be made without departing from the principles and scope of this invention, what is herein defined and is desired to be protected, including such departure from the present disclosure as has come within known or customary practices in the art to which the invention pertains, should be measured, and the invention should be limited, only by the following claims.

What is claimed is:

1. In the manufacture of plastic articles by thermoforming a plurality of plastic articles from a plastic sheet, a method of trimming said articles from the connecting web remaining from said sheet, comprising:
   A. providing a plurality of article punches and approximately registering said articles with said punches;
   B. loosely fitting said registered articles within said punches, whereby said articles are loosely supported by said punches;
   C. shearing said web between all said registered and loosely fitted articles, whereby all said articles have complete freedom of movement, each registered and loosely fitted article being movable independently of all surrounding articles;
   D. exactly registering said independently movable articles with said supporting punches and providing a plurality of article dies which are stationary and in close proximity with said connecting web and in trimming relationship to said articles; and
   E. moving said punches towards and into said dies thereby trimming said articles from said web with said punches and said dies.

2. The method of claim 1, wherein said articles are ejected from said punches.

3. The method of claim 1, wherein said articles are disposed in rows and said shearing of step C is initially performed in the machine direction of said sheet.

4. The method of claim 3, wherein said machine direction shearing is performed before step A of claim 1 and creates strips containing one of said rows.

5. The method of claim 4, wherein said shearing of step C in the cross-machine direction of said sheet is performed for said strips after said articles are loosely supported by said punches.

6. The method of claim 5, wherein said shearing of step C in said cross-machine direction is performed once per tier of said articles in each said strip, thereby isolating, in a terminal portion of said strip, a number of said articles corresponding to the number of articles in said tier from the remainder of said strip.

7. The method of claim 6, wherein said cross-machine shearing of said web, said exactly registering of said articles, and said trimming of said articles with punches and said dies are sequentially performed within said portion.

8. The method of claim 5, wherein said cross-machine shearing is performed simultaneously for all said articles in terminal portions of said strips.

9. The method of claim 8, wherein said exactly registering of said articles is thereafter performed simultaneously for all said articles in said terminal portions.

10. The method of claim 9, wherein said trimming is thereafter performed simultaneously for all of said exactly registered articles in said terminal portions.

11. The method of claim 6, wherein said steps A,B,C, D, and E of claim 1 are performed by a sequentially acting trim assembly.

12. The method of claim 5, wherein said steps A,B, C, D, and E of claim 1 are performed by a continuously acting trim assembly.

13. A method for sequentially trimming plastic articles from a surrounding and connecting web, said articles having been thermoformed from a plastic sheet and being disposed in a plurality of rows which are disposed in parallel to the direction of movement of said sheet, comprising:
- A. cutting said web to form strips of articles which are connected by said web in one of said rows;
- B. indexing a selected first article in one of said strips into approximate registration with a first punch;
- C. isolating said first article from succeeding articles in said strip which are capable of restraining movement of said first article in the plane of said web, said isolating comprising cutting a terminal portion of said strip in the cross-machine direction, whereby said terminal portion is separated from said succeeding articles;
- D. exactly registering said first article with said first punch and approximately registering a second article with a second punch;
- E. trimming said first article, whereby said second article is isolated from tensional forces exerted in said plane;
- F. exactly registering said second article with said second punch and approximately registering a final article with a final punch;
- G. trimming said second article, whereby said final article is isolated from tensional forces exerted in said plane;
- H. exactly registering said final article with said final punch;
- I. trimming said final article with said final punch; and
- J. ejecting said trimmed articles from said plane.

14. The method of claim 13, wherein said cutting in step A is performed after said indexing.

15. The method of claim 13, wherein said ejecting of said trimmed articles according to step J is done simultaneously.

16. In the manufacture of plastic articles which have been thermoformed from a plastic sheet and are disposed in a plurality of rows which are attached to a surrounding and connecting web, a method for sequentially trimming said plastic articles from said web with improved accuracy and reliability, said method comprising:
- A. cutting said web in the direction of movement of said sheet to form a plurality of strips, each strip comprising: (1) a forward-moving end and (2) one row of said plastic articles, said row having transverse freedom of movement;
- B. advancing said strips in said direction of movement while loosely indexing a first said plastic article in each said strip so that said first plastic article is approximately aligned with a first punch, said first punch aligning with an associated first stationary die;
- C. cutting said web of each said strip transversely to said direction of movement so that a multi-article terminal portion, which includes said end and said loosely indexed plastic article, is isolated from the remainder of said each strip, thereby enabling said indexed article to have complete freedom of movement for exactly registering itself with said first punch;
- D. approximately aligning a second article in said portion with a second punch associated with a second stationary die while trimming said web from said first article by moving said first punch into said associated first die, thereby enabling said second article to have complete freedom for exactly registering itself with said second punch; and
- E. trimming said web from said second article by moving said second punch into said associated second die.

17. The method of claim 16, wherein said trimmed first and second articles are simultaneously ejected from said first and second punches.

18. The method of claim 17, wherein said ejecting is in a direction transverse to said web.

19. The method of claim 16, wherein said terminal portion of step C includes at least four said articles.

20. The method of claim 16, wherein said indexing of step B is performed by a shoe which is attached to a shoe arm.

21. The method of claim 20, wherein said shoe has a leading edge which is shaped to conform with the surface of said first plastic article which said leading edge contacts.

22. A method of thermoforming a plurality of thermoplastic articles and trimming said thermoplastic articles from a connecting web in surrounding relationship to said articles, comprising, in sequence, the steps of:
- A. preheating a sheet of thermoplastic foam stock material;
- B. clamping said preheated stock material in a fixed position between matched male and female mold members;
- C. initially partially deforming said preheated stock material toward forming cavities of said female mold members by extending plug members from said male mold members;
- D. maintaining said stock material in a partially deformed condition, with said plug members extended for an interval of from about 0.1 to about 2.0 second, without substantial cooling of said stock material;
- E. completely forming said articles by drawing said partially formed preheated sheet into said forming cavities by vacuum and closing said matched mold members to chill the stock material and set a final shape therein;
- F. providing a plurality of article punches and indexing said formed articles into approximate alignment with said punches for performing said trimming;
- G. loosely fitting said aligned articles within said punches, whereby said articles are loosely supported by said punches;
- H. shearing said sheet between all said aligned and loosely fitted articles, whereby all said articles have complete freedom of movement, each aligned and loosely fitted article being movable independently of all surrounding articles;
- I. exactly registering said independently movable articles with said supporting punches and providing a plurality of article dies which are stationary and in close proximity with said connecting web and in surrounding relationship to said articles; and
- J. moving said punches toward and into said dies thereby trimming said articles from said sheet with said punches and said dies.

23. In the manufacture of plastic articles by thermoforming a plurality of plastic articles from a plastic sheet, a method of trimming said articles from the connecting web remaining from said sheet, comprising:
- A. providing a plurality of article punches and approximately registering said articles with said punches;

B. loosely fitting said registered articles within said punches, whereby said articles are loosely supported by said punches;

C. shearing said web to enable said registered articles to have complete freedom of movement independently of surrounding articles;

D. exactly registering said independently movable articles with their respective supporting punches in sequence and providing a plurality of article dies respectively associated with said punches and which are stationary and in close proximity with said connecting web and in trimming relationship to said articles; and E. moving said punches towards and into their respectively associated dies to trim said articles, said articles being trimmed from said web by said punches and dies at the time said articles are exactly registered with their respective supporting punches.

24. A self-alignment trim tool for trimming a plurality of thermoformed articles from a surrounding plastic web which remains from an original plastic sheet, comprising:

A. a punch assembly, comprising:
(1) a moving bolster which is connected to a linear movement means,
(2) a punch platen which is attached to said moving bolster,
(3) a web-cutting means which is rigidly attached to said punch platen and is perpendicularly disposed thereto for imparting machine-direction freedom to said web, and
(4) a plurality of article punches having differing lengths according to a selected sequence;

B. a die assembly, comprising:
(1) a stationary bolster,
(2) a shear die, adjacent to a recess adapted to accommodate said web-cutting means,
(3) a plurality of article dies, forming recesses which accommodate said article punches; and C. an ejection assembly, comprising:
(1) a cylinder rod which is operatively connected to a cylinder means,
(2) an ejector bar which is rigidly attached and perpendicular to the outer end of said cylinder rod,
(3) a plurality of ejector rods which are each rigidly and perpendicularly attached at one end to said ejector bar, said ejector rods having differing lengths according to said sequence, and
(4) a plurality of ejector discs, each said disc being rigidly and perpendicularly attached to the other end of one said ejector rod, whereby:
(a) operation of said linear movement means causes:
(i) said web-cutting means to isolate a terminal portion of said sheet from the remainder of said web, said terminal portion including a number of said thermoformed articles that corresponds to the number of said article punches, and
(ii) said article punches to register with said articles initially loosely and then exactly as said articles become independently moveable and finally to trim said articles from said web, and
(b) operation of said cylinder means causes said ejector discs to engage said plurality of trimmed articles and to eject said articles simultaneously through said article dies.

* * * * *